United States Patent
Araki et al.

(10) Patent No.: US 8,153,747 B2
(45) Date of Patent: Apr. 10, 2012

(54) TWO-PART ORGANOPOLYSILOXANE COMPOSITION

(75) Inventors: Tadashi Araki, Annaka (JP); Tsuneo Kimura, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 83 days.

(21) Appl. No.: 12/851,842

(22) Filed: Aug. 6, 2010

(65) Prior Publication Data

US 2011/0034613 A1    Feb. 10, 2011

(30) Foreign Application Priority Data

Aug. 10, 2009    (JP) .................. 2009-185585

(51) Int. Cl.
*C08G 77/08* (2006.01)
(52) U.S. Cl. ................ 528/18; 528/28; 528/34
(58) Field of Classification Search .............. 528/18, 528/28, 34
See application file for complete search history.

(56) References Cited

U.S. PATENT DOCUMENTS

| | | | | |
|---|---|---|---|---|
| 5,064,898 A | * | 11/1991 | Arai et al. | 524/780 |
| 5,371,116 A | * | 12/1994 | Sakamoto et al. | 522/33 |
| 5,440,002 A | * | 8/1995 | Kimura et al. | 528/17 |
| 5,607,997 A | * | 3/1997 | Kimura et al. | 524/493 |

FOREIGN PATENT DOCUMENTS

| | | |
|---|---|---|
| JP | 3916403 | 2/2007 |
| JP | 3970484 | 6/2007 |

* cited by examiner

*Primary Examiner* — Margaret Moore
(74) *Attorney, Agent, or Firm* — Oblon, Spivak, McClelland, Maier & Neustadt, L.L.P.

(57) ABSTRACT

A two-part organopolysiloxane composition is provided. A first part comprises (A) an organopolysiloxane, (B) a ketene silyl acetal compound or 2-methyldialkoxysilylpropionic ester, (C) an organic compound or silane compound having at least one nitrogen atom, (D) a silane compound having at least two alkoxy groups, and (E) another ketene silyl acetal compound or 2-trialkoxysilylpropionic ester. A second part comprises (F) an organopolysiloxane, (G) an organotin catalyst, and (H) water. The first and second parts are mixed to form a sealing composition which is fast curable to the depth with alcohol removal.

3 Claims, No Drawings

TWO-PART ORGANOPOLYSILOXANE COMPOSITION

CROSS-REFERENCE TO RELATED APPLICATION

This non-provisional application claims priority under 35 U.S.C. §119(a) on Patent Application No. 2009-185585 filed in Japan on Aug. 10, 2009, the entire contents of which are hereby incorporated by reference.

TECHNICAL FIELD

This invention relates to a two-part organopolysiloxane composition of the dealcoholization type which is fast curable to depth.

BACKGROUND ART

Room temperature fast-curable organopolysiloxane compositions of the condensation cure type which are known in the art include one-part compositions comprising a hydroxy-terminated organopolysiloxane as a base polymer and a crosslinker wherein the amount of the crosslinker is minimized to improve a crosslinking rate through hydrolysis, and two-part compositions wherein a hydroxy-terminated organopolysiloxane as a base polymer and a crosslinker are separately packed and mixed on use.

One-part compositions are not regarded fast-curable despite a high cure rate from the surface, because deep-section cure takes a certain time. It is believed that two-part compositions are effective where fast cure is of high priority. Although two-part compositions of the condensation cure type are relatively good in deep-section cure, they are cumbersome to handle and unamenable to automatic mixers or dispensers because two parts are mixed in a different volume ratio from 1:1. For complete cure to the depth, it is necessary to strictly determine the amount of crosslinker added relative to the amount of terminal hydroxy groups of organopolysiloxane or to add water as a deep-section curing agent.

On the other hand, organopolysiloxane compositions of the addition cure type are advantageous in working because two parts are mixed in a ratio of 1:1. However, heating ovens are usually necessary for curing. Also the working environment is limited since the curing catalyst can be poisoned in the presence of an addition poison.

JP 3916403 discloses a composition comprising a diorganopolysiloxane blocked at both ends of the molecular chain with hydrolyzable hydroxy groups, an organic compound having at least one carbonyl group (C=O) in the molecule, and an organic compound having at least one primary amino group ($NH_2$) in the molecule. This composition is intended to improve deep-section cure and fast-cure by utilizing water produced additionally from ketimine-forming reaction between carbonyl and primary amino groups. Thus the composition is improved in deep-section cure and fast-cure. However, when heat is applied in the uncured state, the dialkylketoxime which is the condensation reaction product is quickly gasified whereby bubbles are introduced in the cured composition, bringing a substantial drop in sealing capability, which is undesirable particularly in the automotive oil-seal application. JP 3970484 overcomes the problem by limiting the type and amount of the curing agent so as to prevent bubble formation in the cured composition.

Although these patents propose an effective approach, a problem arises when this approach is applied to organopolysiloxane compositions of the dealcoholization type. The cure rate is slightly accelerated, but apparently slow as compared with the compositions of the deoximation type. Thus the approach is not applicable in the automobile and electrical and electronic industries where fast cure is required. Even when the conventional measure of adding water as the deep-section curing agent is employed for the purpose of improving cure, no dramatic improvement in cure is achieved.

Citation List
Patent Document 1: JP 3916403
Patent Document 2: JP 3970484

SUMMARY OF INVENTION

An object of the invention is to provide a two-part organopolysiloxane composition of the dealcoholization type which is fast curable to depth.

The inventors have found that cure takes place immediately after a ketene silyl acetal compound of formula (5), shown below, 2-methyldialkoxysilylpropionic ester of formula (6), shown below, or partial hydrolyzate thereof is mixed with silanol groups in air in the presence of an organic compound having at least one nitrogen atom. By placing the ketene silyl acetal compound of formula (5), 2-methyldialkoxysilylpropionic ester of formula (6) or partial hydrolyzate thereof in a first part substantially free of silanol groups, and mixing the first part with a silanol group-containing second part, there is obtained a mixture which is drastically improved in cure behavior. When water is placed in the second part, a better fast-cure behavior is obtained. The invention is predicated on these findings.

The invention provides a two-part organopolysiloxane composition comprising first and second parts wherein the composition cures after the first and second parts are mixed together. The first part comprises:

(A) 50 to 190 parts by weight of an organopolysiloxane having the general formula (1):

$$HO(SiR^1{}_2O)_nH \tag{1}$$

wherein $R^1$ is each independently a substituted or unsubstituted monovalent hydrocarbon group of 1 to 10 carbon atoms, and n is an integer of at least 10, (B) 0.1 to 20 parts by weight of at least one compound selected from the group consisting of a ketene silyl acetal compound having the general formula (2), a 2-methyldialkoxysilylpropionic ester having the general formula (3), and partial hydrolyzates thereof,

$$(R^2O)_2Si(R^3)OC(OR^3)CHCH_3 \tag{2}$$

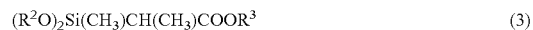
$$(R^2O)_2Si(CH_3)CH(CH_3)COOR^3 \tag{3}$$

wherein $R^2$ is an alkyl group of 1 to 4 carbon atoms, $R^3$ is a substituted or unsubstituted alkyl group of 1 to 12 carbon atoms, $R^2$ and $R^3$ may be the same or different, (C) 0.01 to 20 parts by weight of an organic compound having at least one nitrogen atom in the molecule and/or a silane compound having at least one nitrogen atom in the molecule, (D) 0.1 to 30 parts by weight of a silane compound having at least two alkoxy groups in the molecule, represented by the general formula (4), or a partial hydrolytic condensate thereof,

$$R^5{}_mSi(OR^4)_{4-m} \tag{4}$$

wherein $R^4$ is an unsubstituted or alkoxy-substituted monovalent hydrocarbon group of 1 to 4 carbon atoms, $R^5$ is a substituted or unsubstituted monovalent hydrocarbon group of 1 to 10 carbon atoms, and m is 0, 1 or 2, and (E) 0.1 to 10 parts by weight of at least one compound selected from the group consisting of a ketene silyl acetal compound having the general formula (5), a 2-trialkoxysilylpropionic ester having the general formula (6), and partial hydrolyzates thereof, $$(R^2O)_3SiOC(OR^3)CHCH_3 \quad (5)$$

$$(R^2O)_3SiCH(CH_3)COOR^3 \quad (6)$$

wherein $R^2$ and $R^3$ are as defined above.

The second part comprises (F) 150 to 10 parts by weight of an organopolysiloxane having the general formula (7):

$$HO(SiR^1{}_2O)_nH \quad (7)$$

wherein $R^1$ and n are as defined above, (G) 0.01 to 10 parts by weight of an organotin catalyst, and (H) 0.1 to 10 parts by weight of water. It is assumed that the total amount of components (A) and (F) is 200 parts by weight, and the amounts of components (B) to (E) in the first part and the amounts of components (G) and (H) in the second part are relative to the total amount of components (A) and (F) which is 200 parts by weight.

In a preferred embodiment, component (A) is 80 to 120 parts by weight and component (F) is 120 to 80 parts by weight, with the proviso that the total amount of components (A) and (F) is 200 parts by weight.

The composition is typically used as a sealant in automotive parts or electrical and electronic parts.

ADVANTAGEOUS EFFECTS OF INVENTION

The two-part organopolysiloxane composition effectively cures even under low temperature and low humidity conditions under which prior art room temperature curable organopolysiloxane compositions are not curable. A satisfactory rubbery elastomer is briefly produced. The composition is advantageously used as adhesives and sealants, especially as sealants in the automotive and electrical and electronic applications.

DESCRIPTION OF EMBODIMENTS

The two-part organopolysiloxane composition of the invention is defined as comprising a first part comprising components (A) to (E) and a second part comprising components (F) to (H). After the first and second parts are mixed together, the resulting composition cures briefly.

Component (A) in the first part is an organopolysiloxane having the general formula (1).

$$HO(SiR^1{}_2O)_nH \quad (1)$$

In formula (1), $R^1$ is each independently a substituted or unsubstituted monovalent hydrocarbon group of 1 to 10 carbon atoms, examples of which include alkyl groups such as methyl, ethyl, propyl, butyl, hexyl and octyl, cycloalkyl groups such as cyclohexyl, alkenyl groups such as vinyl, allyl, propenyl, butenyl, and hexenyl, aryl groups such as phenyl and tolyl, aralkyl groups such as benzyl and phenylethyl, and substituted forms of the foregoing in which some or all hydrogen atoms are replaced by halogen atoms (e.g., chloro, fluoro or bromo), such as trifluoropropyl. Inter alia, methyl and phenyl are preferred, with methyl being most preferred. Groups $R^1$ may be the same or different.

In formula (1), n is an integer of at least 10, and preferably such an integer that the organopolysiloxane may have a viscosity in the range of 25 to 500,000 mPa·s, more preferably 500 to 100,000 mPa·s at 25° C. Note that the viscosity is measured at 25° C. by a rotational viscometer.

In the composition of the invention, the total amount of components (A) and (F) is 200 parts by weight. The amount of component (A) in the first part is 50 to 190 parts by weight (to be combined with 150 to 10 parts by weight of component (F)), preferably 70 to 150 parts by weight (to be combined with 130 to 50 parts by weight of component (F)), more preferably 80 to 120 parts by weight (to be combined with 120 to 80 parts by weight of component (F)), and even more preferably 90 to 110 parts by weight (to be combined with 110 to 90 parts by weight of component (F)). If the amount of component (A) is less than 50 pbw (to be combined with more than 150 pbw of component (F)) or more than 190 pbw (to be combined with less than 10 pbw of component (F)), then the fast-cure behavior may be unsatisfactory. Note that "part by weight" is sometimes abbreviated as "pbw."

Component (B) is a ketene silyl acetal compound having the general formula (2), a 2-methyldialkoxysilylpropionic ester having the general formula (3), or a partial hydrolyzate thereof. It is essential for alkoxylating component (A) at both ends.

$$(R^2O)_2Si(R^3)OC(OR^3)CHCH_3 \quad (2)$$

$$(R^2O)_2Si(CH_3)CH(CH_3)COOR^3 \quad (3)$$

Herein $R^2$ is an alkyl group of 1 to 4 carbon atoms, $R^3$ is a substituted or unsubstituted alkyl group of 1 to 12 carbon atoms, $R^2$ and $R^3$ may be the same or different, In formulae (2) and (3), $R^2$ is an alkyl group of 1 to 4 carbon atoms, which may be either straight or branched. Examples include methyl, ethyl, propyl, n-butyl, isopropyl, tert-butyl, sec-butyl, and isobutyl. Groups $R^2$ may be the same or different.

$R^3$ is an alkyl group of 1 to 12 carbon atoms, which may be straight, cyclic or branched. Examples include straight alkyl groups such as methyl, ethyl, propyl, n-butyl, hexyl, heptyl, octyl, nonyl and decyl, cyclic alkyl groups such as cyclohexyl, branched alkyl groups such as tert-butyl and 2-ethylhexyl, and halo-substituted forms of the foregoing in which some or all hydrogen atoms are replaced by halogen atoms (e.g., chloro, fluoro or bromo), such as chloromethyl, bromoethyl and trifluoropropyl. Groups $R^3$ may be the same or different.

Preferably $R^2$ is methyl or ethyl, with methyl being more preferred. Also preferably $R^3$ is methyl, ethyl, n-butyl, or 2-ethylhexyl, with 2-ethylhexyl being more preferred. Component (B) used herein may be a single compound or a mixture of two or more compounds.

Since the ketene silyl acetal compound of formula (2) and the 2-methyldialkoxysilylpropionic ester of formula (3) are isomers, they are available as a mixture from hydrosilylation reaction between an acrylic ester and a methyldialkoxysilane. A commercially available compound may be used such as OCMS-2 (Shin-Etsu Chemical Co., Ltd.).

The ketene silyl acetal compound, 2-methyldialkoxysilylpropionic ester or partial hydrolyzate thereof as component (B) is used in an amount of 0.1 to 20 parts by weight, preferably 1 to 15 parts by weight relative to 200 parts by weight of components (A) and (F) combined. Outside the range, less amounts of component (B) may be insufficient to alkoxylate component (A) at both ends with component (B), resulting in a composition which is poor in storage stability and appearance or builds up its viscosity. Excessive amounts of component (B) may lead to an extended curing time and rubber with poor mechanical properties, and be costly.

Component (C) is an organic compound and/or silane compound having at least one nitrogen atom in the molecule. It is an essential catalyst for facilitating efficient terminal modification of component (A) with component (B) within a short time.

Typical of the organic compound having at least one nitrogen atom in the molecule are amine compounds including primary amines such as methylamine, ethylamine, propylamine, butylamine, and octylamine, secondary amines such as dimethylamine, dipropylamine, dibutylamine, and dioctylamine, and tertiary amines such as trimethylamine, triethylamine, tripropylamine, tributylamine, and trioctylamine. Typical of the silane compound having at least one nitrogen atom in the molecule are alkoxysilanes including 3-aminopropyldiethoxymethylsilane, 3-aminopropyltriethoxysilane, 3-aminopropyldimethoxymethylsilane, 3-aminopropyltrimethoxysilane, 3-aminomethyltriethoxysilane, 3-aminomethyltrimethoxysilane, 3-(2-aminoethylaminopropyl)dimethoxymethylsilane, 3-(2-aminoethylaminopropyl)trimethoxysilane, 2-aminoethylaminomethyldimethoxymethylsilane, 2-aminoethylaminomethyltrimethoxysilane, and 1,1,3,3-tetramethyl-2-[3-(trimethoxysilyl)propyl]guanidine. The organic compound or silane compound having at least one nitrogen atom in the molecule is not particularly limited as long as it displays basicity in air. Inter alia, 3-aminopropyltriethoxysilane and 1,1,3,3-tetramethyl-2-[3-(trimethoxysilyl)propyl]guanidine are preferred, with the latter being more preferred.

The organic compound or silane compound having at least one nitrogen atom in the molecule as component (C) is used in an amount of 0.01 to 20 parts by weight, preferably 0.1 to 10 parts by weight relative to 200 parts by weight of components (A) and (F) combined. Outside the range, less amounts of component (C) may be insufficient to alkoxylate component (A) at both ends with component (B). Excessive amounts of component (C) may adversely affect odor and shelf stability.

Component (D) is a silane compound having at least two, preferably at least three alkoxy groups in the molecule or a partial hydrolytic condensate thereof which helps the composition cure more appropriately. This silane compound has the general formula (4):

wherein $R^4$ is an unsubstituted or alkoxy-substituted monovalent hydrocarbon group of 1 to 4 carbon atoms, $R^5$ is a substituted or unsubstituted monovalent hydrocarbon group of 1 to 10 carbon atoms, and m is 0, 1 or 2.

In formula (4), $R^4$ is an optionally alkoxy-substituted monovalent hydrocarbon group of 1 to 4 carbon atoms. Suitable monovalent hydrocarbon groups include alkyl groups of 1 to 4 carbon atoms such as methyl, ethyl, propyl and butyl. Suitable alkoxy-substituted alkyl groups include methoxymethyl, ethoxymethyl, propoxymethyl, butoxymethyl, pentyloxymethyl, methoxyethyl, ethoxyethyl, propoxyethyl, butoxyethyl, methoxypropyl, ethoxypropyl, propoxypropyl, methoxybutyl, ethoxybutyl, and methoxypentyl. Inter alia, methyl and ethyl are preferred.

$R^5$ is an optionally substituted monovalent hydrocarbon group of 1 to 10 carbon atoms, examples of which include alkyl groups such as methyl, ethyl, propyl, butyl, hexyl and octyl, cycloalkyl groups such as cyclohexyl, alkenyl groups such as vinyl, allyl, propenyl, butenyl, and hexenyl, aryl groups such as phenyl and tolyl, aralkyl groups such as benzyl and phenylethyl, and substituted forms of the foregoing in which some or all hydrogen atoms are replaced by halogen atoms (e.g., chloro, fluoro or bromo), such as trifluoropropyl. Inter alia, methyl and phenyl are preferred, with methyl being most preferred. Groups $R^5$ may be the same or different.

Illustrative examples of the silane compound include alkoxysilanes such as tetramethoxysilane, ethyl silicate, propyl silicate, methyltrimethoxysilane, methyltriethoxysilane, vinyltrimethoxysilane, vinyltriethoxysilane, phenyltrimethoxysilane, phenyltriethoxysilane, methyltris(methoxyethoxy)silane, vinyltris(methoxyethoxy)silane, dimethyldimethoxysilane, dimethyldiethoxysilane, diphenyldimethoxysilane, and vinylmethyldimethoxysilane, and partial hydrolytic condensates thereof. The partial hydrolytic condensates may be straight, branched or cyclic. The partial hydrolytic condensates are generally oligomers having a degree of polymerization of about 2 to 8. Component (D) used herein may be a single compound or a mixture of two or more compounds.

The silane compound having at least two alkoxy groups in the molecule or partial hydrolytic condensate thereof as component (D) is used in an amount of 0.1 to 30 parts by weight, preferably 1 to 15 parts by weight relative to 200 parts by weight of components (A) and (F) combined. Outside the range, less amounts of component (D) may allow for an extremely fast cure rate which is unfavorable in working. Excessive amounts of component (D) may adversely affect mechanical properties of rubber.

Component (E) is a ketene silyl acetal compound having the general formula (5), a 2-trialkoxysilylpropionic ester having the general formula (6), or a partial hydrolyzate thereof. It is an essential component capable of reacting with the silanol-containing organopolysiloxane in the second part to provide a satisfactory fast-cure behavior.

Herein $R^2$ and $R^3$ are as defined above.

In formulae (5) and (6), exemplary groups of $R^2$ and $R^3$ may be the same as $R^2$ and $R^3$ in formulae (2) and (3). The groups of $R^2$ and $R^3$ may be the same or different. Preferably $R^2$ is methyl or ethyl, with methyl being more preferred. Also preferably $R^3$ is methyl, ethyl, n-butyl, or 2-ethylhexyl, with ethyl being more preferred. Component (E) used herein may be a single compound or a mixture of two or more compounds.

Since the ketene silyl acetal compound of formula (5) and the 2-trialkoxysilylpropionic ester of formula (6) are isomers, they are available as a mixture from hydrosilylation reaction between an acrylic ester and a trialkoxysilane. A commercially available compound may be used such as ECMS (Shin-Etsu Chemical Co., Ltd.).

The ketene silyl acetal compound, 2-trialkoxysilylpropionic ester or partial hydrolyzate thereof as component (E) is preferably added after components (A) and (B) are mixed, more preferably after at least 5 minutes from mixing of components (A) and (B). If component (E) is added before silanol groups in component (A) are modified with alkoxy groups in component (B), then the resulting composition is sometimes unstable in air. The order of addition of components (C) and (D) is not particularly limited.

The ketene silyl acetal compound, 2-trialkoxysilylpropionic ester or partial hydrolyzate thereof as component (E) is used in an amount of 0.1 to 10 parts by weight, preferably 0.5 to 5 parts by weight relative to 200 parts by weight of components (A) and (F) combined. Outside the range, less amounts of component (E) may fail in fast-cure behavior. Excessive amounts of component (E) may lead to an extremely fast cure rate which is unfavorable in working, adversely affect mechanical properties of rubber, and be costly.

Reference is now made to the second part. Component (F) is an organopolysiloxane having the general formula (7):

$$HO(SiR^1{}_2O)_nH \qquad (7)$$

wherein $R^1$ and n are as defined above for formula (1).

In formula (7), $R^1$ is each independently a substituted or unsubstituted monovalent hydrocarbon group of 1 to 10 carbon atoms, examples of which include alkyl groups such as methyl, ethyl, propyl, butyl, hexyl and octyl, cycloalkyl groups such as cyclohexyl, alkenyl groups such as vinyl, allyl, propenyl, butenyl, and hexenyl, aryl groups such as phenyl and tolyl, aralkyl groups such as benzyl and phenylethyl, and substituted forms of the foregoing in which some or all hydrogen atoms are replaced by halogen atoms (e.g., chloro, fluoro or bromo), such as trifluoropropyl. Inter alia, methyl and phenyl are preferred, with methyl being most preferred. Groups $R^1$ may be the same or different.

In formula (7), n is an integer of at least 10, and preferably such an integer that the organopolysiloxane may have a viscosity in the range of 25 to 500,000 mPa-s, more preferably 500 to 100,000 mPa-s.

Although component (F) may have a different substituent or degree of polymerization from component (A), component (F) is preferably the same as component (A). The amount of component (F) compounded is as described above.

Component (G) is an organotin catalyst which is essential for the composition to cure. Examples of the organotin catalyst include organotin compounds such as dimethyldimethoxytin, dibutyltin diacetate, dibutyltin dioctoate, dibutyltin dibenzylmaleate, dioctyltin diacetate, and dioctyltin diversatate. These compounds may be used alone or in admixture of two or more.

Component (G) is used in an amount of 0.01 to 10 parts by weight, preferably 0.05 to 1 part by weight relative to 200 parts by weight of components (A) and (F) combined. With less than 0.01 pbw of component (G), surface cure may be retarded. More than 10 pbw of component (G) may lead to an extremely fast cure rate to interfere with the working process, form a composition which lacks elongation, and adversely affect mechanical properties of rubber.

Component (H) is water which is essential for rendering the composition fast curable. Water is used in an amount of 0.1 to 10 parts by weight, preferably 0.5 to 4 parts by weight relative to 200 parts by weight of components (A) and (F) combined. The composition may cure slowly in the presence of less than 0.1 pbw of water whereas more than 10 pbw of water may be detrimental to curing.

The second part may be prepared by mixing components (F) to (H) in a standard way.

To the two-part organopolysiloxane composition comprising components (A) to (H) mentioned above, at least one filler is preferably added if necessary for improving flow properties prior to curing and imparting desired mechanical properties to the cured rubbery elastomer. The filler may be added to the first and/or second part. Examples of suitable fillers include silica such as fumed silica and wet silica, which are optionally treated with organosilicon compounds (e.g., silanes, silazanes and siloxanes), carbon powder, talc, bentonite, calcium carbonate, zinc carbonate, and magnesium carbonate which are optionally surface treated with fatty acids or resin acids, calcium oxide, zinc oxide, magnesium oxide, aluminum oxide and aluminum hydroxide, which are optionally surface treated. Surface treated fillers having a minimal content of water are preferred. The filler is preferably used in an amount of 2 to 600 parts by weight relative to 200 parts by weight of components (A) and (F) combined.

The two-part organopolysiloxane composition is obtained by combining components (A) to (E) to form the first part, combining components (F) to (H) to form the second part, and adding any desired additives to either one or both of these parts in a humidity-shielded state, if desired. The first and second parts are contained and held in separate sealed containers until use when they are mixed together and cured into a rubbery elastomer. Use is in the standard way of so-called two-part organopolysiloxane compositions.

After two parts are combined, the two-part organopolysiloxane composition cures with water in the second part and airborne moisture and at the same time, component (E) reacts with component (F) in air in the presence of component (C), whereby cure occurs not only from the surface, but also from the interior of the composition. That is, fast cure and deep-section cure take place at the same time. The cure rate can be controlled by changing the viscosity of component (A) as a base polymer and the amount of component (E) added. Since the cured composition has improved mechanical properties, a sealant having excellent properties is provided.

The composition is useful as sealants and adhesives, particularly in the automotive and electrical and electronic applications.

It is noted that the curing conditions for the two-part organopolysiloxane composition are not particularly limited. Advantageously, the two-part organopolysiloxane composition may cure under low temperature and low humidity conditions which are not acceptable to prior art room temperature-curable organopolysiloxane compositions.

EXAMPLE

Examples and Comparative Examples are given below by way of illustration and not by way of limitation.

Example 1

To 100 parts by weight of a silanol end-capped polydimethylsiloxane having a viscosity of 5,000 mPa-s at 25° C. were added 5 parts by weight of the reaction product of 2-ethylhexyl acrylate with dimethoxymethylsilane (trade name OCMS-2, Shin-Etsu Chemical Co., Ltd.) and 0.6 part by weight of 1,1,3,3-tetramethyl-2-[3-(trimethoxysilyl)propyl]guanidine. The ingredients were mixed on a mixer to effect reaction. To the reaction mixture were added 10 parts by weight of a partial hydrolytic condensate of methyltrimethoxysilane (trade name KC-89E, Shin-Etsu Chemical Co., Ltd.), 5 parts by weight of 3-aminopropyltriethoxysilane, and 1 part by weight of the reaction product of ethyl acrylate with trimethoxymethylsilane (trade name ECMS, Shin-Etsu Chemical Co., Ltd.). The ingredients were thoroughly mixed under vacuum, yielding a first part.

To 100 parts by weight of a silanol end-capped polydimethylsiloxane having a viscosity of 5,000 mPa-s at 25° C. were added 1 part by weight of water and 0.2 part by weight of dioctyltin diversatate. The ingredients were mixed on a mixer, yielding a second part.

The first and second parts were mixed in a volume ratio of about 1:1, yielding sample #1.

Example 2

To 100 parts by weight of a silanol end-capped polydimethylsiloxane having a viscosity of 5,000 mPa-s at 25° C. were added 5 parts by weight of the reaction product of 2-ethylhexyl acrylate with dimethoxymethylsilane (trade name OCMS-2, Shin-Etsu Chemical Co., Ltd.) and 0.6 part by weight of 1,1,3,3-tetramethyl-2-[3-(trimethoxysilyl)propyl]guanidine. The ingredients were mixed on a mixer to effect reaction. To the reaction mixture were added 10 parts by weight of a partial hydrolytic condensate of methyltrimethoxysilane (trade name KC-89E, Shin-Etsu Chemical Co., Ltd.), 5 parts by weight of 3-aminopropyltriethoxysilane, and 3 parts by weight of the reaction product of ethyl acrylate with trimethoxymethylsilane (trade name ECMS, Shin-Etsu Chemical Co., Ltd.). The ingredients were thoroughly mixed under vacuum, yielding a first part.

To 100 parts by weight of a silanol end-capped polydimethylsiloxane having a viscosity of 5,000 mPa-s at 25° C. were added 1 part by weight of water and 0.2 part by weight of dioctyltin diversatate. The ingredients were mixed on a mixer, yielding a second part.

The first and second parts were mixed in a volume ratio of about 1:1, yielding sample #2.

Comparative Example 1

A composition, designated sample #3, was prepared under the same conditions as in Example 1 except that the reaction product of ethyl acrylate with trimethoxymethylsilane was omitted from the first part.

Comparative Example 2

A composition, designated sample #4, was prepared under the same conditions as in Example 1 except that water was omitted from the second part.

Comparative Example 3

A composition, designated sample #5, was prepared under the same conditions as in Example 1 except that 1,1,3,3-tetramethyl-2-[3-(trimethoxysilyl)propyl]guanidine and 3-aminopropyltriethoxysilane (component (C)) were omitted from the first part.

Comparative Example 4

A composition, designated sample #6, was prepared under the same conditions as in Example 1 except that dioctyltin diversatate was omitted from the second part.

The samples obtained in Examples and Comparative Examples were examined by the following tests.
Tests The desired sample of the two-part organopolysiloxane composition of each of Examples and Comparative Examples was obtained by charging a sealed container with first and second parts in a volume ratio of about 1:1 and mixing together. The composition (sample) thus mixed was cast into a mold of 2 mm deep and cured at 23° C. and RH 50% for 3 days, obtaining a rubber sheet of 2 mm thick. The rubber conversion time was determined as a time taken until the composition mixed as above cured under the sealed conditions into rubber. A tack-free time was measured by the method according to JIS A5758. Rubber physical properties of the 2-mm thick sheet were measured according to JIS K6249.

In Examples and Comparative Examples, the first and second parts were separately shelf stored at room temperature for 6 months before the same tests were carried out.

The test results of Examples 1 and 2 and Comparative Examples 1 to 4 are shown in Table 1.

TABLE 1

|  |  | Example | | Comparative Example | | | |
|---|---|---|---|---|---|---|---|
|  |  | 1 | 2 | 1 | 2 | 3 | 4 |
| Initial Physical properties | Rubber conversion time, min | 15 | 5 | >120 | >120 | >120 | >120 |
|  | Tack-free time, min | 5 | 3 | 60 | 120 | >120 | >120 |
|  | Hardness, Durometer A | 22 | 24 | 24 | 2 | uncured | uncured |
|  | Elongation at break, % | 90 | 120 | 150 | 300 |  |  |
|  | Tensile strength, MPa | 0.4 | 0.5 | 0.3 | 0.1 |  |  |
| After RT/6 month storage | Rubber conversion time, min | 20 | 10 | >120 | >120 | >120 | >120 |
|  | Tack-free time, min | 6 | 5 | 60 | 120 | >120 | >120 |
|  | Hardness, Durometer A | 24 | 23 | 22 | 2 | uncured | uncured |
|  | Elongation at break, % | 80 | 80 | 180 | 310 |  |  |
|  | Tensile strength, MPa | 0.3 | 0.3 | 0.3 | 0.1 |  |  |

Japanese Patent Application No. 2009-185585 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A two-part organopolysiloxane composition comprising first and second parts wherein the composition cures after the first and second parts are mixed together,
said first part comprising
(A) 50 to 190 parts by weight of an organopolysiloxane having the general formula (1):

$$HO(SiR^1_2O)_nH \quad (1)$$

wherein $R^1$ is each independently a substituted or unsubstituted monovalent hydrocarbon group of 1 to 10 carbon atoms, and n is an integer of at least 10,
(B) 0.1 to 20 parts by weight of at least one compound selected from the group consisting of a ketene silyl acetal compound having the general formula (2), a 2-methyldialkoxysilylpropionic ester having the general formula (3), and partial hydrolyzates thereof, $$(R^2O)_2Si(R^3)OC(OR^3)CHCH_3 \quad (2)$$

$$(R^2O)_2Si(CH_3)CH(CH_3)COOR^3 \quad (3)$$

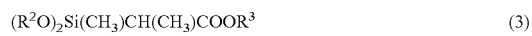

wherein $R^2$ is an alkyl group of 1 to 4 carbon atoms, $R^3$ is a substituted or unsubstituted alkyl group of 1 to 12 carbon atoms, $R^2$ and $R^3$ may be the same or different, (C) 0.01 to 20 parts by weight of an organic compound having at least one nitrogen atom in the molecule and/or a silane compound having at least one nitrogen atom in the molecule, (D) 0.1 to 30 parts by weight of a silane compound having at least two alkoxy groups in the molecule, represented by the general formula (4), or a partial hydrolytic condensate thereof, $$R^5{}_m Si(OR^4)_{4-m} \tag{4}$$

wherein $R^4$ is an unsubstituted or alkoxy-substituted monovalent hydrocarbon group of 1 to 4 carbon atoms, $R^5$ is a substituted or unsubstituted monovalent hydrocarbon group of 1 to 10 carbon atoms, and m is 0, 1 or 2, and (E) 0.1 to 10 parts by weight of at least one compound selected from the group consisting of a ketene silyl acetal compound having the general formula (5), a 2-trialkoxysilylpropionic ester having the general formula (6), and partial hydrolyzates thereof, $$(R^2O)_3SiOC(OR^3)CHCH_3 \tag{5}$$

$$(R^2O)_3SiCH(CH_3)COOR^3 \tag{6}$$

wherein $R^2$ and $R^3$ are as defined above, said second part comprising (F) 150 to 10 parts by weight of an organopolysiloxane having the general formula (7):

$$HO(SiR^1{}_2O)_n H \tag{7}$$

wherein $R^1$ and n are as defined above, (G) 0.01 to 10 parts by weight of an organotin catalyst, and (H) 0.1 to 10 parts by weight of water, with the proviso that the total amount of components (A) and (F) is 200 parts by weight, and the amounts of components (B) to (E) in the first part and the amounts of components (G) and (H) in the second part are relative to the total amount of components (A) and (F) which is 200 parts by weight.

2. The composition of claim 1 wherein component (A) is 80 to 120 parts by weight and component (F) is 120 to 80 parts by weight, with the proviso that the total amount of components (A) and (F) is 200 parts by weight.

3. The composition of claim 1 which is used as a sealant in automotive parts or electrical and electronic parts.

* * * * *